United States Patent [19]

Meabon et al.

[11] Patent Number: 5,792,234
[45] Date of Patent: *Aug. 11, 1998

[54] METHOD FOR APPLYING A CARBON COATING TO OPTICAL FIBERS

[75] Inventors: Joseph C. Meabon, Castle Hayne, N.C.; Michelle R. Tuzzolo, Wrightsville Beach, N.Y.; Eric H. Urruti, Wilmington, N.C.

[73] Assignee: Corning Incorporated, Corning, N.Y.

[ * ] Notice: The term of this patent shall not extend beyond the expiration date of Pat. No. 5,611,835.

[21] Appl. No.: 757,989

[22] Filed: Nov. 27, 1996

Related U.S. Application Data

[60] Continuation of Ser. No. 473,695, Jun. 7, 1995, Pat. No. 5,611,835, which is a division of Ser. No. 258,770, Jun. 13, 1994, abandoned, which is a division of Ser. No. 950,072, Sep. 23, 1992, Pat. No. 5,346,520.

[51] Int. Cl.⁶ .................................................. C03B 37/027
[52] U.S. Cl. ....................................................... 65/430
[58] Field of Search ............................................. 65/430

[56] References Cited

U.S. PATENT DOCUMENTS

| | | | |
|---|---|---|---|
| 4,018,313 | 4/1977 | McNeilly et al. ........... | 156/610 |
| 4,118,211 | 10/1978 | Au Coin et al. . | |
| 4,183,621 | 1/1980 | Kao et al. . | |
| 4,309,201 | 1/1982 | Klop ........................... | 65/529 |
| 4,356,673 | 11/1982 | Schmitt ........................ | 118/718 |
| 4,367,085 | 1/1983 | Suto et al. . | |
| 4,453,961 | 6/1984 | Berkey . | |
| 4,486,212 | 12/1984 | Berkey . | |
| 4,512,629 | 4/1985 | Hanson et al. . | |
| 4,592,932 | 6/1986 | Biswas et al. . | |
| 4,659,354 | 4/1987 | Roba ............................ | 65/423 |
| 4,735,856 | 4/1988 | Schultz et al. . | |
| 4,832,706 | 5/1989 | Yates ............................ | 51/93 |
| 5,000,541 | 3/1991 | DiMarcello et al. . | |
| 5,035,484 | 7/1991 | Ishiguro et al. . | |
| 5,037,464 | 8/1991 | Oohashi et al. . | |
| 5,043,001 | 8/1991 | Cain et al. . | |
| 5,152,817 | 10/1992 | Bennett et al. . | |
| 5,157,755 | 10/1992 | Ooe et al. . | |
| 5,256,177 | 10/1993 | Bennett ........................ | 65/423 |
| 5,256,205 | 10/1993 | Schmitt ........................ | 118/718 |
| 5,296,011 | 3/1994 | Aikawa ........................ | 65/423 |
| 5,320,659 | 6/1994 | Ishiguro ....................... | 65/423 |
| 5,348,564 | 9/1994 | Aikawa ........................ | 65/423 |
| 5,354,348 | 10/1994 | Zushi ........................... | 65/423 |
| 5,377,491 | 1/1995 | Schalle ........................ | 65/510 |
| 5,611,835 | 3/1997 | Meabon et al. .............. | 65/384 |

FOREIGN PATENT DOCUMENTS

| | | |
|---|---|---|
| 0393755 | 10/1990 | European Pat. Off. . |
| 0424012 | 4/1991 | European Pat. Off. . |
| 2156858 | 10/1985 | United Kingdom . |

OTHER PUBLICATIONS

Jaeger et al., "Fiber Drawing and Control", Optical Fiber Telecommunications, chap. 9, pp. 263–298, Academic Press, 1979.

Inada, "Recent Progress in Fiber Fabrication Techniques by Vapor–Phase Axial Deposition", IEEE Journal of Quantum Electronics, vol. AE–18, No. 10, Oct. 1982.

Lu et al., "Hermetically Coated Optical Fibers", International Wire & Cable Symposium Proceedings, pp. 241–244, 1987.

Lu et al., "Recent Developments in Hermetically Coated Optical Fiber", Journal of Lightwave Technology, vol. 6, No. 2, pp. 240–244, Feb. 1988.

Lemaire et al., "Hydrogen Permeation in Optical Fibers with Hermetic Carbon Coatings", Electronics Letters, vol. 24, No. 21, pp. 1323–1324, Oct. 13, 1988.

*Primary Examiner*—John Hoffmann
*Attorney, Agent, or Firm*—Edward F. Murphy

[57] ABSTRACT

A method and reactor for applying a carbon coating to an optical fiber wherein the build up of reaction by-products within the reactor having metal walls is reduced by providing cooler reactors walls, dual fiber exit ports with different inside diameters, and gas shielding at one fiber exit port.

2 Claims, 2 Drawing Sheets

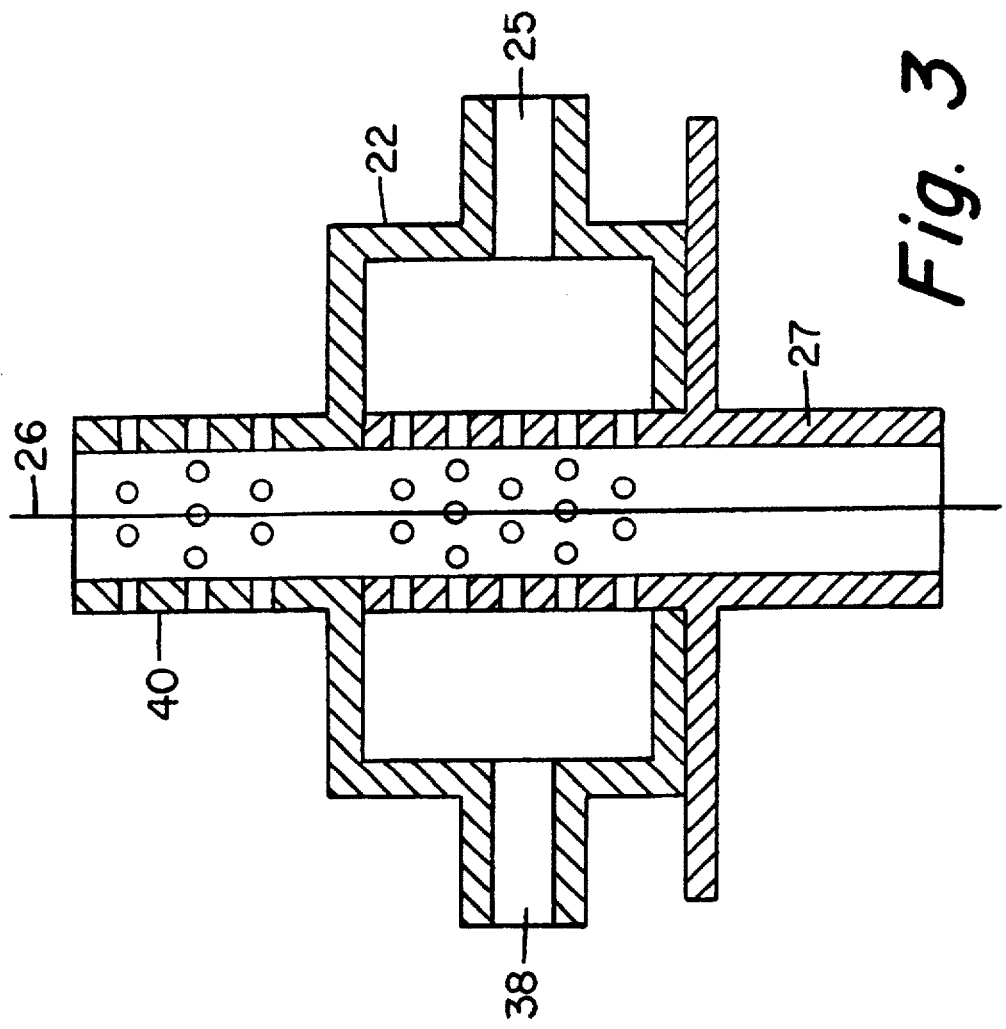
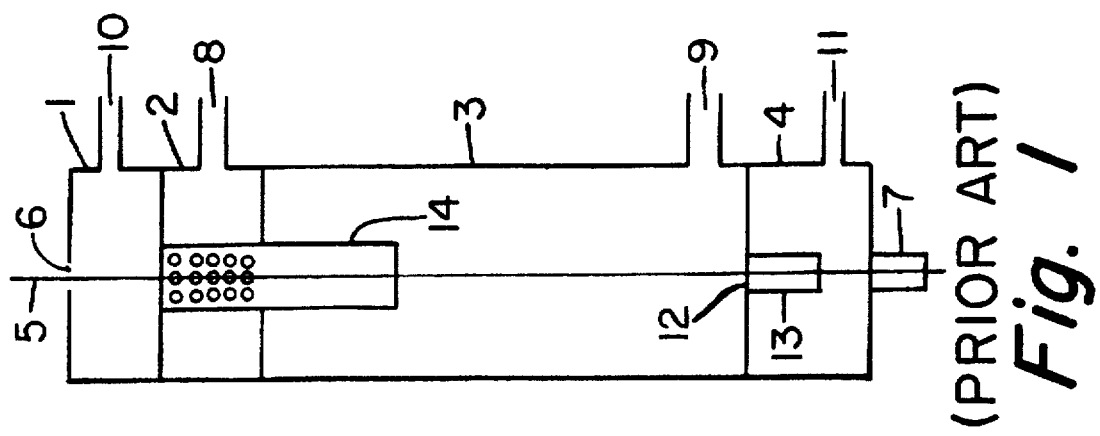

METHOD FOR APPLYING A CARBON COATING TO OPTICAL FIBERS

This is a Continuation of U.S. patent application Ser. No. 08/473,695 filed Jun. 7, 1995 now U.S. Pat. No. 5,611,835, which is a Divisional of U.S. patent application Ser. No. 08/258,770 filed Jun. 13, 1994 now abandoned, which is a Divisional of U.S. patent application Ser. No. 07/950,072 filed Sep. 23, 1992 now U.S. Pat. No. 5,346,520.

BACKGROUND OF THE INVENTION

This invention relates to an apparatus for providing a carbon-containing coating on optical waveguide fibers.

Optical waveguide fibers are typically provided with abrasion-resistant coatings such as silicone or polyurethane acrylate, for example. These coatings are usually applied to the pristine surface of the fiber during the fiber drawing process. While these coatings provide protection from abrasion, they do not provide adequate protection from corrosion or hydrogen attack.

Various chemicals, including water, can attack a fiber, affecting both optical and mechanical properties thereof. Microcracks in a fiber surface are regions which are more susceptible to such attack, especially when the fiber is under stress. The growth of these microcracks due to chemical attack reduces the mechanical strength of a fiber and may result in static fatigue or sudden failure of the fiber.

If a fiber is exposed to an atmosphere containing hydrogen, the hydrogen will diffuse into the fiber. Such diffusion is detrimental to the optical performance of the fiber. An attenuation increase caused by the diffusion of hydrogen after an optical fiber has been installed may result in degradation of the transmission link which includes the fiber.

The presence of water and hydrogen are of particular concern in optical fiber applications such as underwater cables. These applications often require long-lengths between signal amplification, and there is little or no tolerance for increased attenuation in the fibers during their fiber service life. Also, replacement of fibers which have failed due to chemical attack would be prohibitively expensive.

Various coatings have been developed to provide protection to optical waveguide fibers from chemical attack and to increase the strength of the fiber. These coatings have contained various materials, including carbon, metals and ceramics. See, for example, U.S. Pat. No. 4,512,629 (carbon coating); U.S. Pat. No. 4,592,932 (metallic coating); U.S. Pat. No. 4,118,211 (ceramic coating).

Metallic and ceramic coatings have been used with varying degrees of success with respect to the reduction of strength degradation due to microcracks in the fiber surface. However, such coatings have not proven to be sufficiently impermeable to hydrogen.

Carbon coatings are known to produce water resistant, high strength optical fibers. See, for example, Kao et al. U.S. Pat. No. 4,183,621. Carbon coatings have also been shown to be sufficiently impermeable to hydrogen diffusion. Lemaire et al., "Hydrogen Permeation in Optical Fibres with Hermetic Carbon Coatings", Electronics Letters, vol. 24, no. 21, pages 1323–24, Oct. 13, 1988; Lu et al., "Recent Developments in Hermetically Coated Optical Fiber", J. of Lightwave Technology, vol. 6, no. 2, pages 240–244, February, 1988; Lu et al., "Hermetically Coated Optical Fibers", International Wire & Cable Symposium Proceedings, pages 241–244, 1987.

One method for providing an optical waveguide fiber involves exposing a fiber to a carbon-containing reactant gas and decomposing the reactant gas by heating it. The required heat for the reaction may be provided by the temperature of the fiber itself, external heating means, or by some combination of the two. The decomposition of the reactant gas produces a high molecular weight reaction product, which forms the desired carbon layer on the fiber, and reaction by-products. The reaction by-products can be either high molecular weight dry particulate matter similar to carbon black, or low molecular weight oily droplets which solidify to a gummy or glassy material. Also, some portion of the reactant gas may remain unreacted.

Low molecular weight reaction by-products are preferentially formed at lower temperatures. High molecular weight reaction by-products are rapidly formed at temperatures above about 150° C. These high molecular weight reaction by-products can be formed as reactant gas flows along with the fiber through the reactor and is exposed to temperatures in the vicinity of the fiber which are higher than 150° C.

Prior art processes and devices for manufacturing optical fibers with carbon coatings have encountered various problems. Alignment of the reactor, in which the carbon coating is applied to a fiber, with the other components of the fiber drawing apparatus is necessary for process stability and repeatability. Prior art devices which have disclosed the material used in construction of the reactor have disclosed the use of quartz or silica tubes. See, for example, Oohashi et al. U.S. Pat. No. 5,037,464; Ishiguro et al. European Patent Publication No. 0,374,926; Schultz et al. U.S. Pat. No. 4,735,856; Evans et al. UK Patent Application No. 2,156,858. Due to the complex shapes required in the reactor design, fabrication of the reactor using quartz or silica lacks dimensional repeatability which adversely affects the ability to initially align the reactor on the fiber drawing apparatus and to maintain alignment during the fiber drawing process.

Additionally, quartz or silica reactors provide insulating properties, elevating the temperature within the reactor and accelerating the formation of undesired reaction by-products. As a result, the rate of formation of high molecular weight reaction by-products is greater than the formation of low molecular weight reaction by-products. High molecular weight reaction by-products may build up within the reactor and impinge on the fiber, damaging the carbon coating and possibly the fiber itself. Because these reaction by-products build up over time, the ability to produce long lengths of coated optical fiber is reduced. In some cases, entire production lots of greater than 100 km of fiber are rejected to ensure the quality of the coating if build up of high molecular weight reaction by-products is detected within the reactor.

Bennett et al. U.S. Pat. No. 5,152,817, to be issued on Oct. 6, 1992, is assigned to the Assignee of the present application. Bennett et al. discloses an apparatus for providing long lengths of optical waveguide fiber with a carbon-containing coating without the build up of high molecular weight reaction by-products within the reactor.

The apparatus of Bennett et al. is shown in FIG. 1. It consists of a combination of an upper isolation chamber 1, reaction chamber 2, receiving chamber 3, and lower isolation chamber 4. Fiber 5 enters the apparatus at fiber inlet 6 and exits through external fiber exit 7. Reactant gas is introduced at inlet 8. Reaction by-products are exhausted through external fiber exit port 7 or through outlet pipe 9 which can be optionally provided. Shield gas is introduced to upper isolation chamber 1 and lower isolation chamber 4 through shield gas inlets 10 and 11, respectively. The inside diameter of external fiber exit port 7 is the same as the internal diameter of internal fiber exit port 13. In a preferred embodiment, the portion of reaction tube 14 within chamber 2 may be perforated, as shown, to evenly distribute the reactant gas radially around fiber 5.

The length and diameter of reaction tube 14 of Bennett et al. are selected to ensure adequate coating thickness and to reduce the build up of high molecular weight reaction by-products inside the reactor. The preferred length is about 5–6.5 cm for an inside diameter (ID) of 1 cm. However, even with these preferred dimensions, oily reaction by-product may build up on the interior surfaces of reaction tube 14. Bennett et al., col. 7, lines 2–6, Detailed Description. Reaction by-products will deposit on the interior walls of receiving chamber 3. The inside diameter of receiving chamber 3 must be at least about 1 inch (2.5 cm) and the length at least 4 inches (10 cm) for the build up of reaction by-products on the walls of receiving chamber 3 to present no problem in the fiber drawing or coating processes. Bennett et al., col. 7, Lines 16–21, Detailed Description.

Even with these design considerations, there is some build up of reaction by-products at opening 12 of internal fiber exit port 13 in Bennett et al. First, an oily low molecular weight reaction by-product will deposit near opening 12. This oily film will solidify over time. High molecular weight particulate reaction by-products will then tend to adhere to the oily film. These particles will serve as sites at which additional reaction by-products will accumulate. This build up can cause damage to the carbon coating or the fiber itself. Even if this build up does not apparently damage the coating or the fiber, detection of the build up will result in rejection of the fiber drawn to ensure the quality of the coating and the fiber. Therefore, even a slight build up is considered unacceptable.

In another embodiment, Bennett et al. discloses a reactor where the bottom surface of the receiving chamber is angled downwardly away from opening 12 through which the fiber exits the receiving chamber. This angle is disclosed in a specific example as being 50° with respect to the fiber axis. Bennett et al., col. 10, lines 18–22, Detailed Description. The purpose of this angled surface is to prevent any oily reaction by-products which may deposit on the bottom surface of the receiving chamber from flowing toward opening 12 before that deposit solidifies. Bennett et al, col. 10, lines 39–42, Detailed Description.

The reactor in Bennett et al. is made of glass (typically, "PYREX®") except for upper isolation chamber 1 and reaction chamber 2, which are made of aluminum. After a preform is drawn into fiber, the reactor is removed from the drawing apparatus and the glass portion is heated to about 900° F. (480° C.) for a period of about four hours in an oxygen-containing atmosphere to burn off any reaction by-products which may have deposited on the surfaces of the reactor.

Glass reactors have been used instead of metal reactors for several reasons. First, fiber drawing speeds are often less than 6 meters per second. At these speeds, the temperature of the fiber may be reduced to a level at which the desired reaction will not occur unless the fiber is either enclosed by an insulating material such as glass or some means of auxiliary heat is provided. Second, during development, visual analysis was required to determine any process parameter changes which were needed to stabilize the carbon coating reaction. Furthermore, because alignment of the carbon coating apparatus was critical to the process, visual alignment was deemed necessary. These two requirements necessitated the use of glass reactors. Also, a metal reactor would deform at the temperature used for burning reaction by-products off the reactor walls as described above. If the burn off method is used with a metal reactor, it would require lower temperatures for unacceptably longer periods of time than are used for burning off deposits on glass reactors. For example, an aluminum reactor exposed to an oxygen atmosphere at 750° F. (400° C.) for a period of ten hours still exhibited some residue from the build up of reaction by-products.

Jochem European Patent Publication No. 0,393,755 discloses a method of manufacturing an optical fiber with a coating wherein the temperature of the reactor walls is below 800° C. The restriction on the maximum temperature of the reactor walls is designed to reduce the build up of reaction by-products on the reactor walls. The reactor "may comprise an insulated wall or a heating device . . . in order to preclude that the glass fibre cools too rapidly." col. 4, lines 20–23. Jochem only discloses reactor wall temperatures ranging from 600° to 900° C. in a specific example. col. 7, lines 10–29. However, even at 600° C., we believe significant amounts of reaction by-products will be deposited on the reactor walls.

SUMMARY OF THE INVENTION

It is an object of this invention to provide an apparatus for forming a carbon coating on long lengths of optical fiber. This object is achieved by using a reactor made of aluminum. This allows the reaction at or near the reactor walls to occur at temperatures which reduce the formation of high molecular weight reaction by-products, and it provides a cooler reactor wall which retards the conversion of low molecular weight reaction by-products which are deposited on the reactor walls to high molecular weight reaction by-products.

It is another object of this invention to provide a reactor in which the build up reaction by-products on the interior surfaces of the reactor is reduced by designing the reactor such that a boundary layer of reaction by-products and reaction gas which forms near or above the fiber surface is substantially undisturbed within the reactor. In another embodiment of the invention, the design of the fiber exit of the reactor utilizes a dual fiber exit port with different port IDs which further reduces the build up of high molecular weight reaction by-products and subsequent damage to the carbon coating or the fiber itself. In yet another embodiment of the invention, an inert gas shield is used to reduce build up of high molecular weight reaction by-products at the fiber exit and to prevent oxygen from entering the reactor.

It is another object of this invention to provide a reactor design which can more easily withstand handling during use. This object is achieved by replacing the glass portions of the reactor with aluminum, or some other metal, which is less likely to break during cleaning or setup operations.

It is another object of this invention to provide a reactor design with improved dimensional repeatability by using metal in the manufacture of the reactor in place of glass.

BRIEF DESCRIPTION OF THE DRAWINGS

FIG. 1 is a schematic of a prior art apparatus for providing carbon coatings on optical fibers.

FIG. 3 is a cross-sectional representation of a section of an apparatus including perforations in accordance with the present invention.

DETAILED DESCRIPTION

Figure 2:
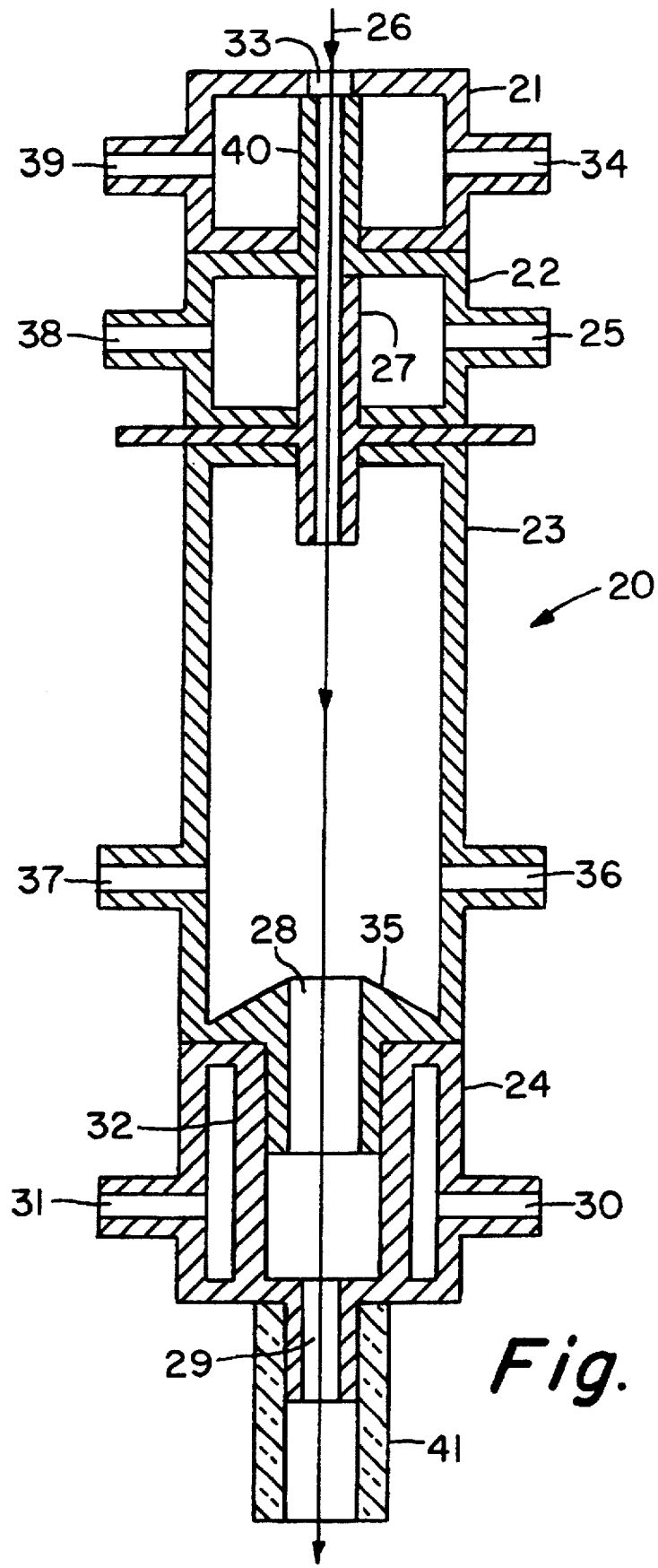
FIG. 2 is a cross-sectional representation of an apparatus in accordance with the present invention.

Equipment for the drawing of optical fiber from an optical fiber preform is well known in the art. A furnace is used to heat a preform to a temperature at which a fiber can be drawn therefrom. The diameter of the drawn fiber is measured by a non-contact device. The fiber is then typically coated with an abrasion-resistant coating and wound onto spools. See, for example, Jaeger et al., "Fiber Drawing and Control", Optical Fiber Telecommunications, chap. 9, pages 263-298, Academic Press, 1979. If application of a carbon coating is desired, this is performed after the fiber is drawn from the preform and before the abrasion-resistant coating is applied.

FIG. 2 shows one embodiment of the present invention. Only the carbon coating reactor is shown. The reactor 20 includes upper isolation chamber 21, reaction chamber 22, receiving chamber 23, and lower isolation chamber 24. Reactant gas inlets 25 and 38 provide for the introduction of reactant gas to reaction chamber 22.

Reactor 20 is preferably constructed of aluminum. The use of aluminum for the reactor allows for tight tolerances (±0.005") in the manufacture of the reactor. These tighter manufacturing tolerances provide for more repeatable alignment of the reactor with the other devices of the fiber drawing apparatus. Also, with a metal reactor, any reactions of reactant gases at or near the reactor walls will occur at a cooler temperature than with the use of insulating materials such as quartz or silica. Because of the high thermal conductivity of aluminum, no external cooling is required to provide the benefit of reduced reactor temperature.

These reduced temperatures allow the dominant reaction by-product at or near the reactor walls to be low molecular weight oily droplets which will deposit on the reactor walls and form a film. To inhibit these low molecular weight reaction by-products from flowing toward the fiber, angled surface 35 is provided. These reaction by-products will form a film on surface 35 and solidify. This build up does not impede the fiber drawing and coating processes. The preferred angle is about 4.5°, although other angles may be used. Angles in the range of about 0°-15° have been tested. The minimum effective angle is about 2°, and we believe that the maximum effective angle is about 67.5°.

Reactor 20 is positioned on the fiber drawing apparatus such that the temperature of the fiber is sufficient to produce the desired reaction of the reactant gases. Fiber 26 enters reactor 20 at fiber inlet 33. The direction of fiber movement is shown by the arrow. The temperature of fiber 26 at fiber inlet 33 is difficult to measure due to the small size of the fiber and drawing conditions, especially the draw speed. However, we estimate the temperature to be in the range of about 1,200°-1,800° C., with a minimum fiber temperature of about 1,000° C. being necessary within the reactor for the reaction to occur. Upper isolation chamber 21 prevents the entry of ambient atmosphere into the top of the reactor. Upper isolation gas is introduced into upper isolation chamber 21 through upper isolation gas inlets 34 and 39. In a preferred embodiment, tube 40 may be perforated, as shown in FIG. 3, to evenly distribute upper isolation gas radially about fiber 26. In a preferred embodiment, the perforations are in a spiralled pattern, i.e., the perforations in a given row are not vertically aligned with the perforations in either the row immediately above or the row immediately below that given row.

Reactant gases are introduced through reactant gas inlets 25 and 38. In a preferred embodiment, perforations are provided in the portion of reaction tube 27 within chamber 22, as shown in FIG. 3, to evenly distribute the reactant gas radially about fiber 26. In a preferred embodiment, the perforations are in a spiralled pattern, i.e., the perforations in a given row are not vertically aligned with the perforations in either the row immediately above or the row immediately below that given row. The reactant gases react immediately upon contacting fiber 26, producing the desired carbon coating. The reaction continues as the fiber moves through reaction chamber 27. A boundary layer of high molecular weight reaction by-products, low molecular weight reaction by-products and unreacted gases forms near or above the surface of the moving fiber. The reaction by-products and unreacted gases will accelerate to the fiber drawing speed and move with fiber 26 as it passes through reactor 20. The diameter of internal fiber exit port 28 is chosen to avoid disruption of the boundary layer formed near or above the fiber surface. This prevents high molecular weight reaction by-products contained in the boundary layer from building up around internal fiber exit port 28. In one embodiment, the internal diameter of internal fiber exit port 28 is 0.51 inches (13 mm).

Build up of high molecular weight reaction by-products at external fiber exit port 29 is prevented by blanketing external fiber exit port 29 with shield gas introduced through shield gas inlets 30 and 31. The shield gas may be any inert gas which keeps the reactor free of oxygen, with nitrogen being preferred. In a preferred embodiment, lower isolation tube 32, having a larger diameter than internal fiber exit port 28, is provided, and lower isolation tube 32 is perforated to radially distribute the shield gas flow about fiber 26. These perforations are not shown in the drawings, but they are similar to the perforations in tube 40 and reaction tube 27, as shown in FIG. 3 and discussed above. The shield gas directs the boundary layer formed near or above the fiber surface out of the reactor through external fiber exit port 29, sweeping any high molecular weight reaction by-products out of the reactor through external fiber exit port 29. The shield gas also prevents the entry of ambient atmosphere into the reactor through external fiber exit port 29. In a preferred embodiment, the internal diameter of external fiber exit port 29 is 0.255 inches (6 mm).

Reaction by-products contained in the boundary layer are exhausted through external fiber exit port 29. These reaction by-products deposit on glass tube 41, which is provided for that purpose. Glass tube 41 is coated with a black glassy residue after a preform is drawn. This residue does not interfere with the fiber drawing or coating processes. In a preferred embodiment, receiving chamber exhaust ports 36 and 37 are provided to exhaust additional reaction by-products.

The reactor body may be made of any material which exhibits sufficient thermal conductivity to cool the reactor body. Means for auxiliary cooling of the reactor may optionally be provided if the material used in construction of the reactor does not exhibit sufficient thermal conductivity to cool the reactor body without auxiliary cooling. The auxiliary cooling may be passive (for example, fins attached to the exterior surfaces of the reactor body to increase the available surface area for convection cooling) or active (for example, a cooling jacket assembly attached to the exterior of the reactor body with cooling fluid circulation). However, aluminum is preferred as it requires no auxiliary cooling and Is easy to machine to tight tolerances. The temperature of the reactor walls is less than about 150° C. when aluminum is used without any auxiliary cooling. At or below about 150° C., any reaction by-products which form at or near the walls of the reactor will have a low molecular weight and an oilier, more flowing consistency which will tend to cause these low molecular weight reaction by-products to deposit on the reactor walls. Thus, substantially all of the high molecular weight reaction by-products which form within the reactor are entrained within the boundary layer near or above the fiber surface and are not deposited on the walls of the reactor as described above.

Some high molecular weight reaction by-products may escape the boundary layer, particularly at points where the boundary layer is disrupted. Some disruption of the boundary layer occurs where reaction tube 27 opens into receiving chamber 23. Any high molecular weight reaction by-products which escape the boundary layer at this point will stick to the film formed on the receiving chamber walls by the low molecular weight reaction by-products. Additional low molecular weight reaction by-products will then tend to deposit over the high molecular weight reaction by-products. Because the receiving chamber is relatively large in diameter, as compared to the reaction tube and the internal and external fiber exit ports, any such build up does not interfere with the fiber drawing or coating process. Also, because of the relatively lower temperature of the receiving chamber walls, as opposed to the higher temperatures at or near the fiber surface, the conversion of any build up of low molecular weight reaction by-products on the receiving chamber walls to high molecular weight reaction by-products is retarded. This would be of particular concern at internal fiber exit port 28 or external fiber exit port 29, where the surfaces of those fiber exit ports are in close proximity to the relatively high temperature of the fiber. Any low molecular weight reaction by-products which deposit over high molecular weight reaction by-products in these areas of the reactor will tend to further react to form high molecular weight reaction by-products which may interfere with the fiber drawing and coating processes. Therefore, it is important to prevent the disruption of the boundary layer in the vicinity of internal fiber exit port 28 and external fiber exit port 29, thereby preventing the deposition of any high molecular weight reaction by-products in these areas of the reactor.

Shield gas may be provided at internal fiber exit port 28 by shield gas inlets not shown. Inert gases other than nitrogen may be used as the shield gas provided such other gases keep the reactor free of oxygen. Nitrogen is preferred because of its availability, ease in handling, and relatively low cost.

The reactor is an assembly of smaller units. Upper isolation chamber 21 is bolted to reaction chamber 22. Reaction chamber 22 is attached to receiving chamber 23 via a rotating connection. Lower isolation chamber 24 is attached to receiving chamber 23 using a similar connection. These connections allow for quick disassembly of the reactor to facilitate cleaning, and quick reassembly of the reactor for reinstallation on the fiber drawing apparatus.

Test fibers were made using the present invention. The fibers were drawn from optical waveguide preforms which were produced using standard outside vapor deposition (OVD) techniques as described in, for example, Berkey U.S. Pat. No. 4,453,961 and Berkey U.S. Pat. No. 4,486,212. However, any method suitable for producing preforms from which optical fibers are drawn may be utilized. For example, vapor axial deposition (VAD) techniques, as described in Inada, "Recent Progress in Fiber Fabrication Techniques by Vapor-Phase Axial Deposition", IEEE J. of Quantum Electronics, vol. QE-18, no. 10, October, 1982, and Suto et al. U.S. Pat. No. 4,367,085, may also be used to produce optical fiber preforms. By running consecutive preforms without cleaning the reactor between preforms, greater than 300 km of optical fiber with a nominal diameter of 125 µm have been produced using the present invention without any significant build up of high molecular weight reaction by-products within the reactor.

Fiber was drawn from the preforms on standard optical fiber drawing equipment. The draw speed was 9 m/sec. The top of the reactor was located about 5.18 inches (13.2 cm) from the bottom of the draw furnace. Draw speeds in the range of about 7–9 m/sec have been tested, and we believe that speeds up to about 15 m/sec are achievable using the present invention. The position of the reactor will vary based on the type of fiber being coated, draw speed and other fiber drawing process parameters.

The reactant gas used was methyl acetylene at a flow rate of about 0.2 liters per minute. Shield gas was provided only at upper isolation chamber 21 and lower isolation chamber 24 at a flow rate of about 2 liters per minute for each chamber. Nitrogen was introduced through upper isolation gas inlets 34 and 39 and shield gas inlets 30 and 31.

The reactor was visually inspected after each preform was drawn. No significant build up of high molecular weight reaction by-products at or near internal fiber exit port 28 or external fiber exit port 29 was detected in any of the tests. Build up of oily, low molecular weight reaction by-products was detected. This build up solidified and did not interfere with the coating process.

Any reaction by-products which were deposited on the walls of the reactor were removed after the fiber drawing process was complete. This removal was accomplished by directing a stream of powdered plastic (allypolycarbonate) at about 80 psi at the surfaces of the reactor. This process takes about 5 minutes. With prior reactors made of glass, the heating process used to remove reaction by-products deposited on reactor surfaces takes about four hours at 900° F. (480° C.). The aluminum reactor of the present invention cannot be subjected to such high temperatures without possible deformation of the reactor itself. In one test, an aluminum reactor was heated to about 750° F. (400° C.) for about ten hours in an oxygen atmosphere. There was still some of the residue from the build up of reaction by-products on the reactor walls. The "blasting" technique described above is preferable as it is a vast improvement in turn around time and effectiveness of cleaning over the heating process.

The fibers made under the above conditions were tested for hydrogen permeation, strength, and fatigue.

The hydrogen permeation test is involves exposing fibers to pure hydrogen at 11 atmospheres pressure and 85° C. for 21 days. 29 fibers from 10 different preforms were tested. The average attenuation increase at 1240 nm was 0.006 dB/km for fibers made using the present invention. 1240 nm represents the first harmonic of the fundamental hydrogen vibration and is used to characterize the level of hydrogen permeability of an optical fiber.

Fibers from the same 10 preforms were tested for strength and fatigue performance. The average mean strength was 477 kpsi with a 1σ of 32.7 kpsi. Strength was tested using 0.5 m gage lengths. The average Weibull slope was 73 with a 1σ of 11. The minimum fatigue constant, determined by using FOTP-76, was 1130.

The present invention has been particularly shown and described with reference to the preferred embodiments thereof, however, it will be well understood by those skilled in the art that various changes may be made in the form and details of these embodiments without departing from the true spirit and scope of the invention as defined by the following claims.

We claim:

1. A method for applying a carbon coating to an optical waveguide fiber being drawn on a drawing apparatus, comprising the steps of:

(a) heating an end of a preform in a draw furnace, (b) drawing the fiber from said end of the preform, (c) introducing the fiber to a reactor vessel comprising walls while supplying the reactor vessel with a reactant gas flow comprising a reactant gas, said reactant gas comprising carbon, (d) forming the carbon coating on the fiber by decomposition of said reactant gas, wherein the reactor vessel walls are comprised of a metal.

2. A method of making a carbon coated optical fiber, comprising the steps of:

(a) heating an end of a fiber preform in a draw furnace, (b) drawing the fiber from said end of the preform, (c) introducing the fiber to a reactor vessel comprising walls, (d) supplying the reactor vessel with a reactant gas, said reactant gas comprising carbon, (e) forming the carbon coating on the fiber by decomposition of said reactant gas, wherein the reactor vessel walls are metallic.

* * * * *